(12) United States Patent
Salgado et al.

(10) Patent No.: US 6,433,887 B1
(45) Date of Patent: Aug. 13, 2002

(54) SYSTEMS AND METHODS FOR MANAGING PRINT JOBS

(75) Inventors: David L. Salgado, Victor; Jack Daughton, Rochester; Cynthia Smith, Fairport; Andrew Martin, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,354

(22) Filed: Nov. 24, 1999

(51) Int. Cl.7 .............................................. G06K 15/00
(52) U.S. Cl. ..................................... 358/1.16; 358/1.15
(58) Field of Search .................................. 358/1.1, 1.15, 358/1.16, 1.17, 426.05, 426.02, 404, 444, 1.13, 442, 407, 468; 345/530, 532, 536, 537, 538; 710/22, 74

(56) References Cited

U.S. PATENT DOCUMENTS 6,271,927 B1 * 8/2001 Kohtani et al. ............ 358/1.13
6,373,585 B1 * 4/2002 Mastie et al. .............. 358/1.13

* cited by examiner

Primary Examiner—Arthur G. Evans
(74) Attorney, Agent, or Firm—Oliff & Berridge, PLC (57) ABSTRACT

In a printing system queuing jobs, some jobs are made dependent on primary jobs. If a user delete a primary job, the depending jobs are retrieved and automatically deleted.

11 Claims, 8 Drawing Sheets

SYSTEMS AND METHODS FOR MANAGING PRINT JOBS

BACKGROUND OF THE INVENTION

1. Field of Invention

This invention relates to systems and methods for forming images.

2. Description of Related Art

In some image forming devices that form images based on job instructions, jobs can be queued for later processing by the image forming devices. It is sometimes also possible to generate a proof or sample of a job or a section of a job. Those proof and sample jobs are separate jobs within the queue stored in the image forming device. Proof and sample jobs enable a user to evaluate an output quality of the underlying job. For example, in one exemplary image forming device, a user may produce multiple proofs of a job using different scale factors before selecting a particular scale factor to be used for the underlying job.

Conventionally, when a user decides to delete a job for one or more proof and/or sample jobs, those proof and/or sample jobs remain in the queue and are processed, even if it is no longer necessary or desirable to produce such jobs.

SUMMARY OF THE INVENTION

This invention provides systems and methods that automatically delete proof and/or sample jobs that relates to a deleted underlying job.

Thus, in various exemplary embodiments, in case a user forgets to explicitly delete these proof and/or sample jobs, the systems and methods of this invention prevent the image forming device from performing jobs, and the user from being billed for these jobs that are no longer wanted.

Thus, this invention automatically reclaims system resources that would have been used by these unnecessary proof and/or sample jobs.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the accompanying drawings, wherein.

DETAILED DESCRIPTION OF PREFERRED EMBODIMENTS

As used below, the term "job" relates to a data processing sequence that comprise one or more operations to be performed on a defined set of data. For example, a job may comprise printing image data, transmitting, reducing or enlarging the size of an image, reducing or enlarging the number of colors of an image, reducing or enlarging the number of levels for each color used in an image, compressing or decompressing data, applying error correction, interpolation, or any other known or later developed data processing operation that can be applied to a defined set of data.

Figure 1:
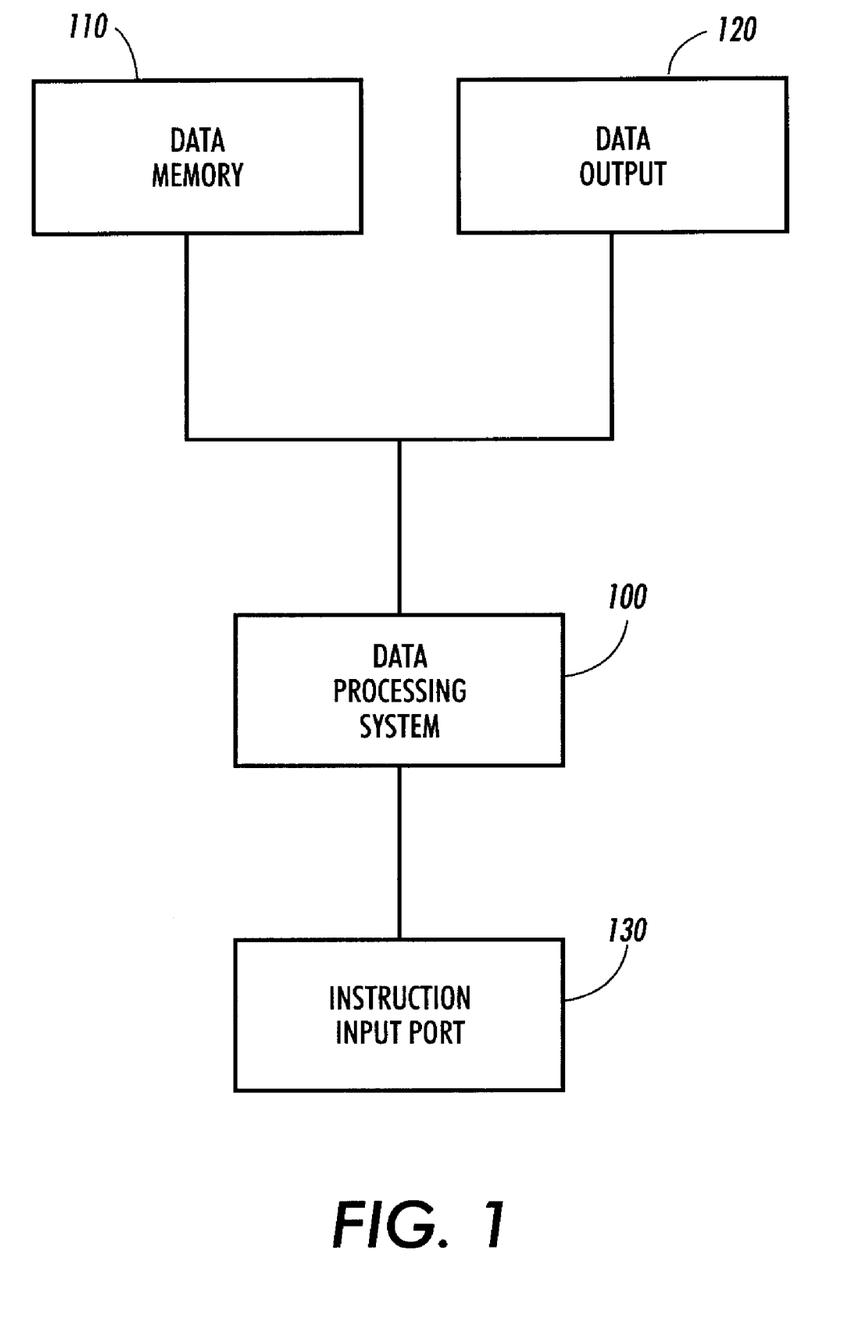
FIG. 1 is a functional block diagram outlining a first exemplary embodiment of a data processing system according to this invention.

FIG. 1 is a functional block diagram outlining a first exemplary embodiment of a data processing system according to this invention. As shown in FIG. 1, a data processing system 100 is connected to a data memory 110, a data output circuit 120 and an instruction input port 130.

The data processing system 100 can be a computer or any other known or later developed system capable of reading data in the data memory 110, processing the read data according to job instructions received at the instruction input port 130 and outputting the processed data to the data output circuit 120 and/or storing the processed data into the data memory 110. The data memory 110 can be one or more of a hard disk, a compact disk, a diskette, an electronic component, a floppy disk, or any other known or later developed system or device capable of storing data. Data stored in the data memory 110 may come from one or more of a telecommunication network, a scanner, a sensor, a processing circuit, a computer, or any known or later developed system capable of generating and/or providing data to the data memory 110.

The data output circuit 120 can be one or more of a printer, a network interface, a memory, a display circuit, a processing circuit or any known or later developed system capable of handling data. The instruction input port 130 allows the data processing system 100 to receive job instructions relating to defined a set of data stored in the data memory 110. The instruction input port 130 can be coupled to one or more of a keyboard, a mouse, a touch screen, a touch pad, a microphone, a network, or any other known or later developed circuit capable of inputting data.

In operation, the data processing system 100 receives instructions at the instruction input port 130. The received instructions relate to jobs to be performed on one or more of the defined sets of data stored in the data memory 110. The data processing system 100 also outputs the result of each of the jobs to the data output circuit 120.

When job instructions are received by the data processing system 100, the job instructions refer to one or more of the defined sets of data stored in the data memory 110. For example, each set of data can correspond to one or more of a document, an image and/or a file. It can occur that a secondary job has one or more predetermined relationships with a primary job. For example, a secondary job may correspond to a sample, a variation or a draft of the primary job. A secondary job and the corresponding primary job may relate to the same set of data, to different sets of data or to different sets of data having a common subset of data. The data processing system 100 stores the job instructions and the relationships in the data memory 110.

If the data processing system 100 determines that there are jobs instructions relating to at least one job in the data memory 110, the data processing system 100 selects one of the jobs to be performed and begins performing the selected job. As long as all the jobs stored in the memory have not been completed, if a job is completed, the data processing system 100 selects a next job to be performed and performs the selected job.

However, an instruction to delete a job can also be received by the data processing system 100. When the data processing system 100 determines that a job deletion is requested for a job, the data processing system 100 searches, in the data memory 120, the other jobs that have a predetermined relationship with the job to be deleted. Then, the job to be deleted and each other job that has the predetermined relationship with the job to be deleted are deleted.

Figure 2:
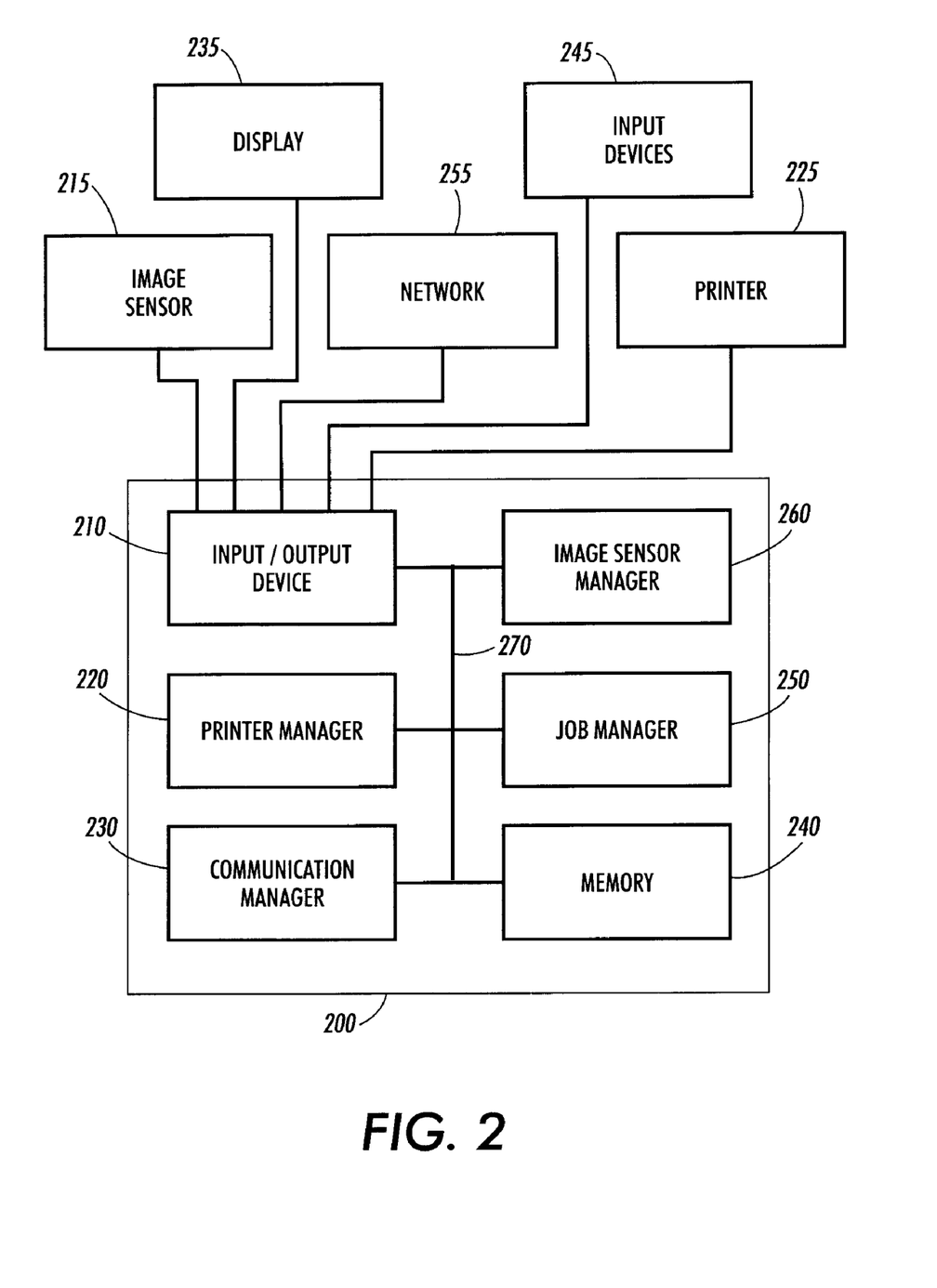
FIG. 2 is a functional block diagram outlining a second exemplary embodiment of the data processing systems according to this invention.

FIG. 2 is a functional block diagram outlining a second exemplary embodiment of the data processing systems according to this invention. As shown in FIG. 2, a data processing system 200 comprises at least some of an input/output port 210, a printer manager 220, a communication manager 230, an memory 240, a job manager 250, and an image sensor manager 260, each connected together by a data/control bus 270.

The input/output port 210 is connected to one or more of an image sensor 215, a printer 225, a display 235, one or more input devices 245 and a network 255. The input/output port 210 receives data from one or more of the image sensor 215, the keyboard 245 and the network 255 and transmits the received data to the data/control bus 270. The input/output port 210 also receives data from the data/control bus 270 and transmits that data to at least one of the printer 225, the display 235, the one or more input devices 245 and the network 255.

The printer manager 220 drives the printer 225. For example, the printer manager 220 can drive the printer 225 to print images, files or documents stored in the memory 240. The display manager 230 drives the display 235. The memory 240 stores defined sets of data relating to images, files and/or documents. The image sensor manager 260 drives the image sensor 215. The communication manager 230 controls the transmission of data to and the reception of data from the network 255. The job manager 250 allows a user to control a job to be performed on one or more of the defined sets of data stored in the memory 240, sets of data received from the network 255 and sets of data received from the image sensor 215.

In operation, the data processing system 200 functions in a multitasking manner and simultaneously performs the processing of job instructions, the input of data and the processing of data according to the job instructions. For example, the data processing system 200 can simultaneously receive a data transmission from the network 255, receive job instructions from the one or more input devices 245 and output an image to the printer 225.

In the job instructions processing task, a user can provide job instructions through either one or both of the one or more input devices 245 and the network 255. Depending on the type of job to be performed and parameters of that job, the user may also specify a dependency of the one or more new or secondary jobs relative to a primary job for which job instructions have already been provided. The job manager 250 associates an identifier to each of the jobs for which the data processing system 200 receives instructions. The identifier of each job indicates whether this job depends on another job and, if so, to which primary job it depends. The job manager 250 stores the job instructions relating to each job for which it has received job instructions in a queue stored in the memory 240.

The user can also provide a deletion request relating to a job that has already been entered but that has not yet been performed. When the user provides a deletion request, the user selects the job to be deleted. The job manager 250 then searches the identifiers of any secondary jobs stored in the memory 240. The job manager 250 next determines which, if any, of the secondary jobs depend on the primary job to be deleted, by determining, for each job identifier, if that job identifier indicates a dependence upon the primary job to be deleted.

Then, the job manager 250 deletes the job corresponding to the deletion request and all of the job instructions stored in the queue that relate to either that job to be deleted or one of the jobs that depend on the job to be deleted. The processing of data relating to each job is performed in turn according to the position of the corresponding job in the queue stored in the memory 240.

Figure 3:
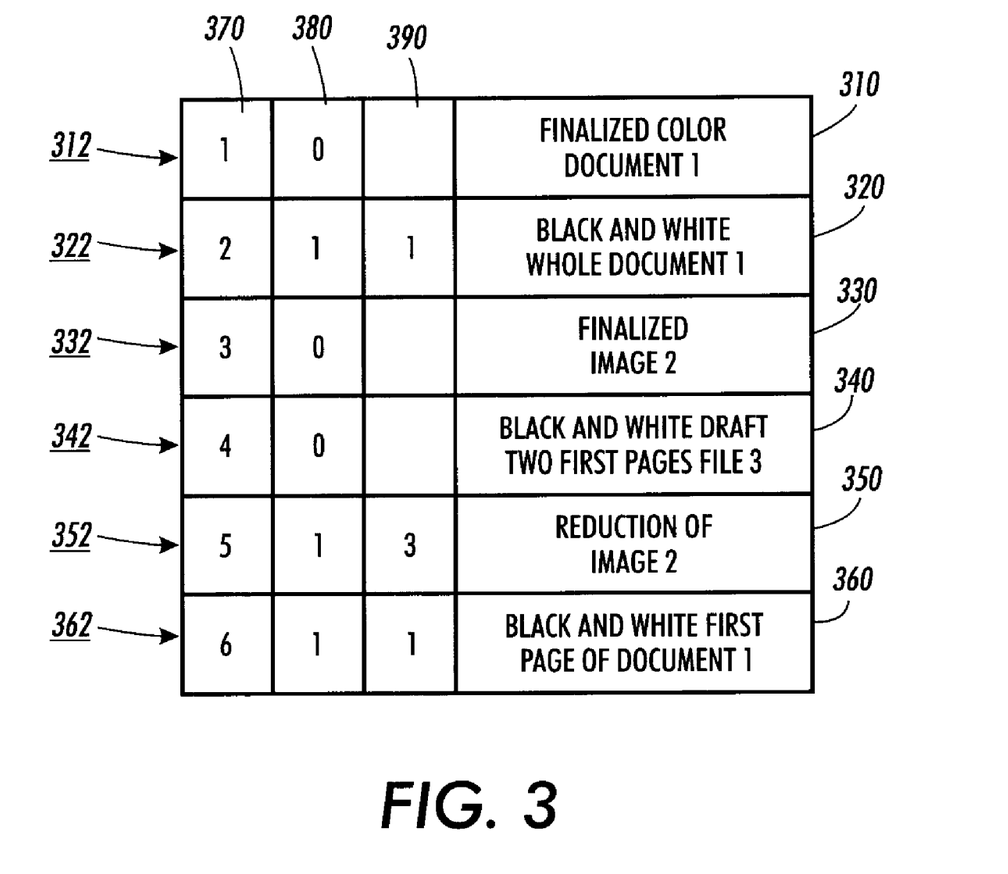
FIG. 3 is a first exemplary embodiment of a queue of jobs to be performed by the data processing systems according to this invention.

FIG. 3 is a first exemplary embodiment of a queue of jobs to be performed by the data processing systems according to this invention. As shown in FIG. 3, a queue 300 of job 310–360 comprises, for each job 310–360, a description of the job to be performed and an identifier 312–362, respectively.

Each identifier 312–362 comprises a field 370 that identifies the job. For example, the first job identifier 312 has a number "1" in its field 370, indicating that the job 310 has been entered first. Similarly, the second job identifier 322 has a number "2" in its field 370, indicating that the job 320 has been entered after the first job but before the other jobs. The jobs identifiers 332–362 respectively have the numbers "3"–"6" in their fields 370.

Each job identifier 312–362 also comprises a field 380 that indicates whether the corresponding job depends on another job. For example, the job identifiers 312, 332 and 342 have a "0" in their fields 380, indicating that the corresponding jobs 310, 330 and 340 do not depend on other jobs. In contrast, the job identifiers 322, 352 and 362 have a "1" in their fields 380, indicating that the corresponding jobs 320, 350 and 360 depend on another job. A job that depends on another job is called a secondary job and the job on which a secondary jobs depend is called a primary job. Each job identifier that correspond to a secondary job, such as the identifiers 322, 352 and 362, has a field 390 that comprises a number identifying the primary job on which that secondary job depends.

The field 390 of the job identifier 322 comprises the number "1", indicating that the secondary job 320 depends on the primary job 310. In the same manner, the field 390 of the job identifier 352 comprises the number "3", indicating that the secondary job 350 depends on the primary job 330. Finally, the field 390 of the identifier 362 comprises the number "1", indicating that the secondary job 360 also depends on the primary job 310.

In operation, if the job 310 is deleted, a determination is made of which other jobs depend on the primary job 310, based on the job identifiers. Then, all of the jobs that depend on the primary job 310 to be deleted are also deleted.

Figure 4A:
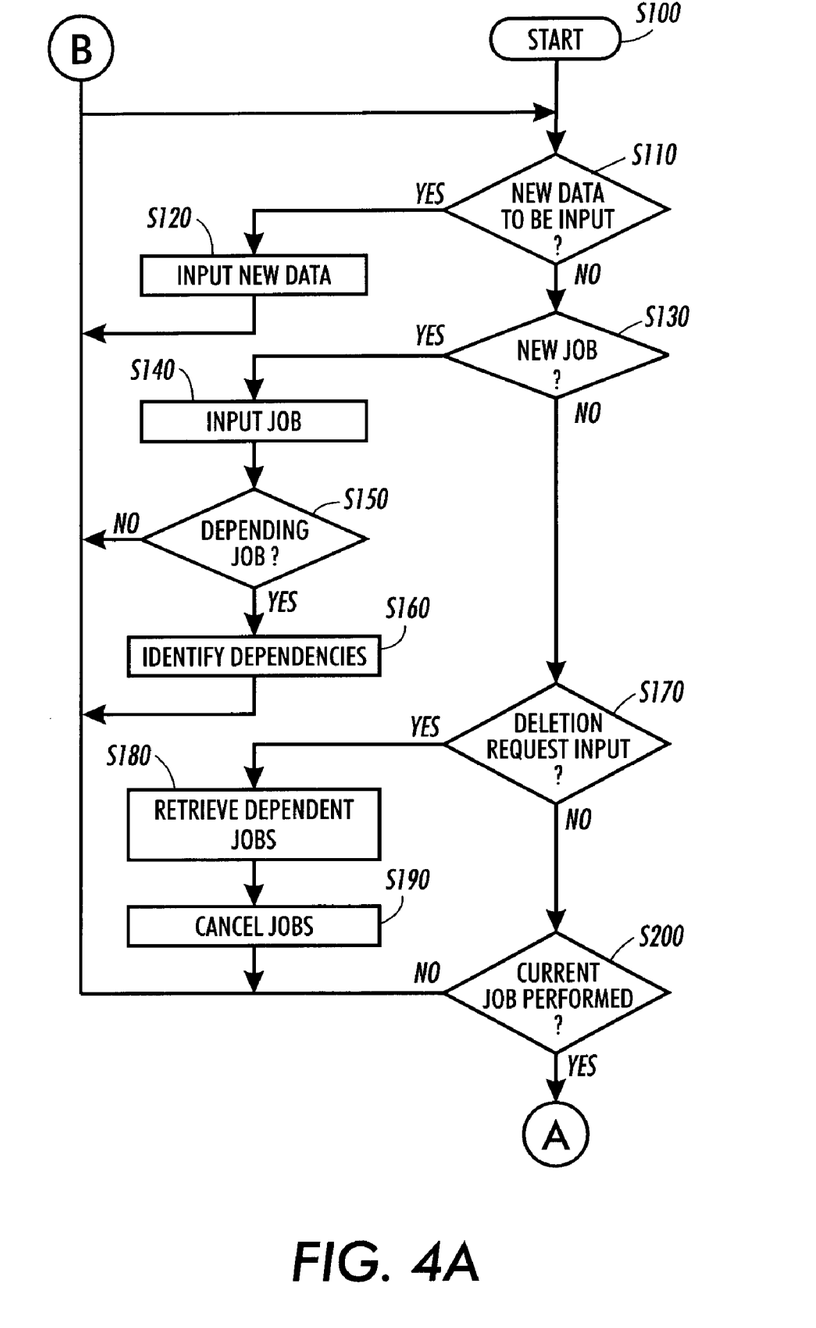
FIGS. 4A and 4B are a flowchart outlining a first exemplary embodiment of a job managing method according to this invention.
Figure 4B:
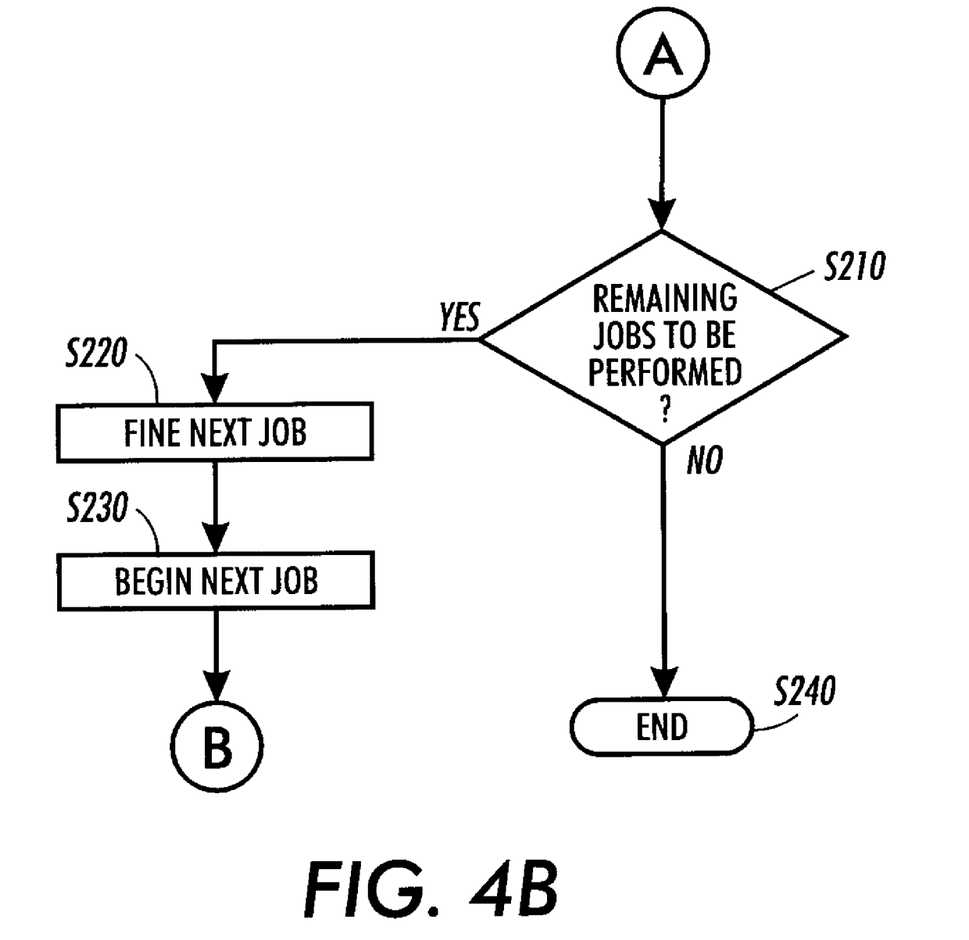

FIGS. 4A and 4B are a flowchart outlining a first exemplary embodiment of a job management method according to this invention. Beginning in step S100, control continues to step S110, where a determination is made whether a new set of data is input. If so, control continues to step S120. Otherwise, control jumps to step S130. In step S120, the sets of data to be input are input. Control then jumps back to step S110. In contrast, in step S130, a determination is made whether a new job is input. If so, control continues to step S140. Otherwise, control jumps to step S170.

In step S140, the new job is input and identified. Next, in step S150, a determination is made whether the new job depends on another job. If so, control continues to step S160. Otherwise, control jumps back to step S110. In step S160, the primary job is identified on which the secondary job depends and the queue entry for the new job is updated to indicate this primary job. Control then jumps back to step S110.

In step S170, a determination is made whether a deletion request is input. If so, control continues to step S180. Otherwise, control jumps to step S200. In step S180, any secondary job that depends on the job corresponding to the deletion request are identified, based on their dependence identifiers. Next, in step S190, all of the secondary jobs that depend from the job corresponding to the deletion request and that job are deleted. Control then jumps back to step S110.

In step S200, a determination is made whether a current job is being performed. If so, control continues to step S210. Otherwise, control jumps back to step S110. In step S210, a determination is made whether there are any other jobs to be performed. If so, control continues to step S220. Otherwise, control jumps to step S240, where the process ends. In step S220, a next job to be performed is selected among the jobs still to be performed. Next, in step S230, the selected job is begun. Control then jumps back to step S110.

Figure 5:
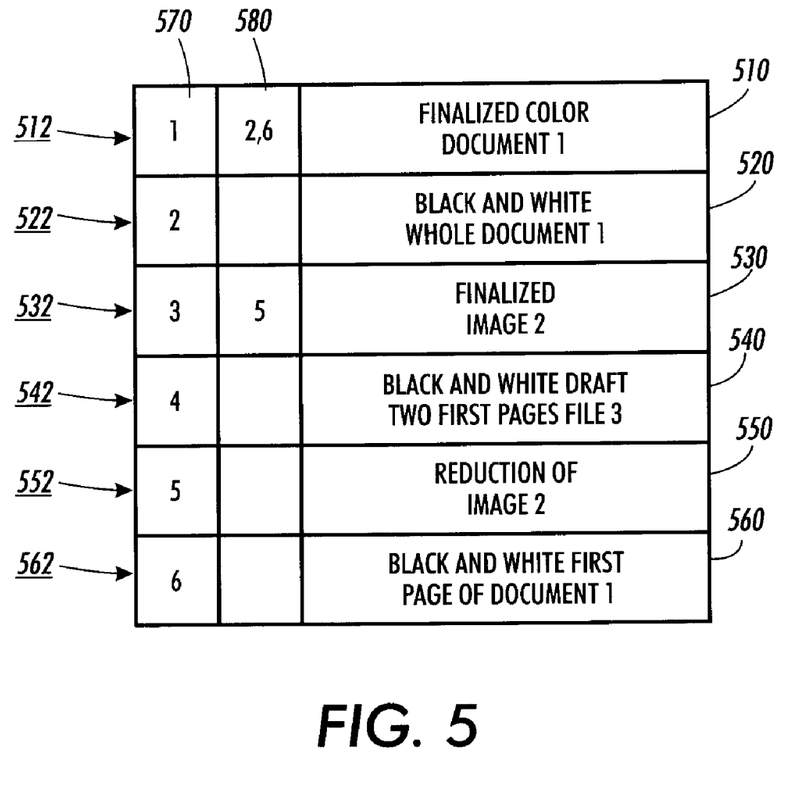
FIG. 5 is a second exemplary embodiment of a queue of jobs to be performed by the data processing systems according to this invention.

FIG. 5 is a second exemplary embodiment of a queue of jobs to be performed by the data processing systems according to this invention. As shown in FIG. 5, a queue 500 of job 510–560 comprises, for each job 510–560, a description of the job to be performed and an identifier 512–562, respectively.

Each identifier 512–562 comprises a field 570 that identifies the job. For example, the first job identifier 512 has a number "1" in its field 570, indicating that the job 510 has been entered first. Similarly, the second job identifier 522 has a number "2" in its field 570, indicating that the job 520 has been entered after the first job but before the other jobs. The jobs identifiers 532–562 respectively have the numbers "3"–"6" in their fields 570.

Each job identifier 512–562 also comprises a field 380 that indicates which of the other jobs in the queue depend on the job. For example, the job identifiers 512 has the numbers "2" and "6" in its field 580, indicating that jobs 520 and 560 depend on job 510. Similarly, the job identifier 532 has the number "5" in its field 580, indicating that job 550 depends on job 530. A job that depends on another job is called a secondary job and the job on which a secondary jobs depend is called a primary job. In contrast, jobs 520 and 540–560 are not primary jobs.

In operation, if the job 510 is deleted, the field 580 of its identifier 512 is read to identify the secondary jobs that depend on job 510. Then, all of the jobs that depend on the job 510, i.e., jobs 520 and 560, are deleted together with job 510.

Figure 6A:
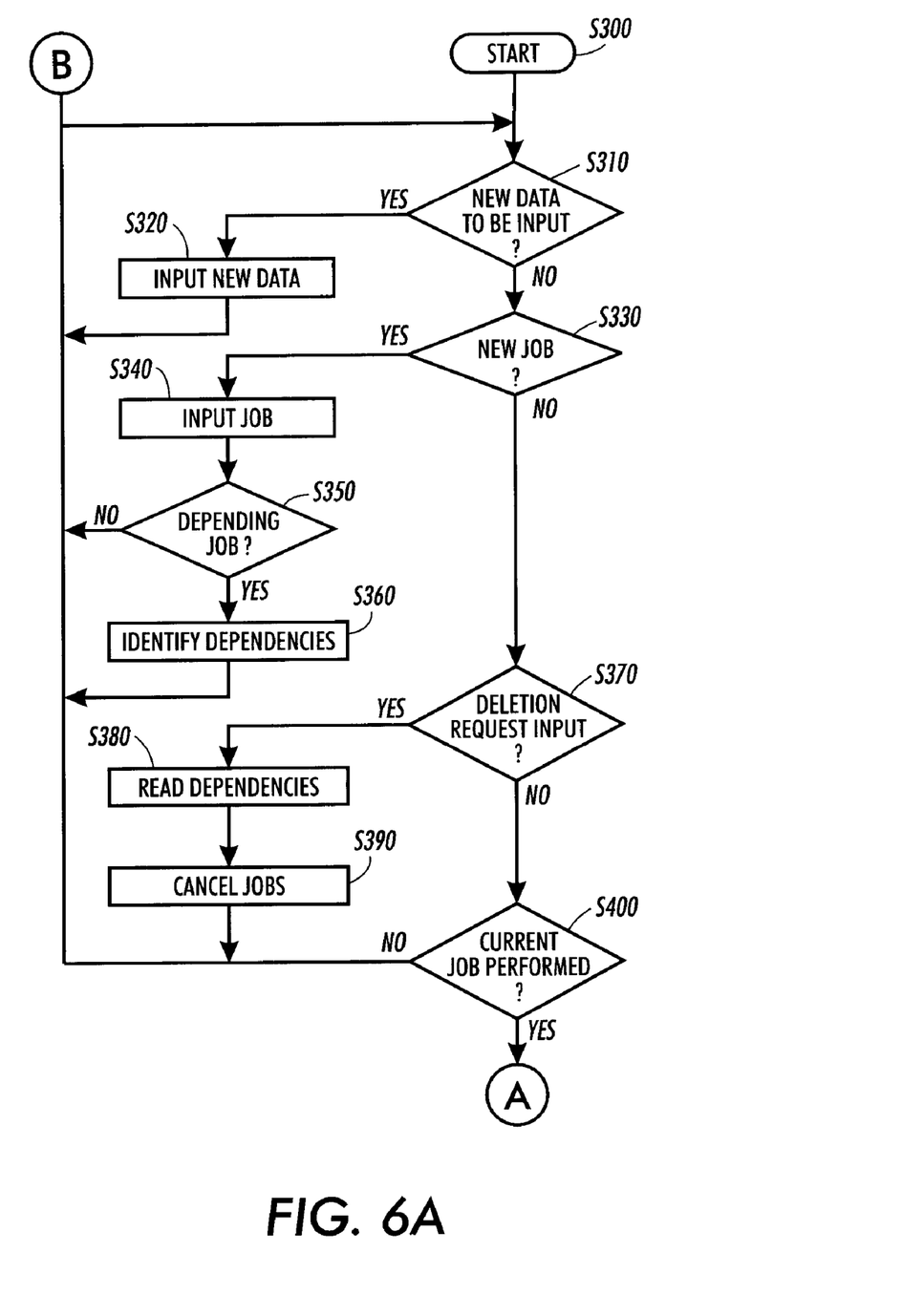
FIGS. 6A and 6B are a flowchart outlining a second exemplary embodiment of a job managing method according to this invention.
Figure 6B:
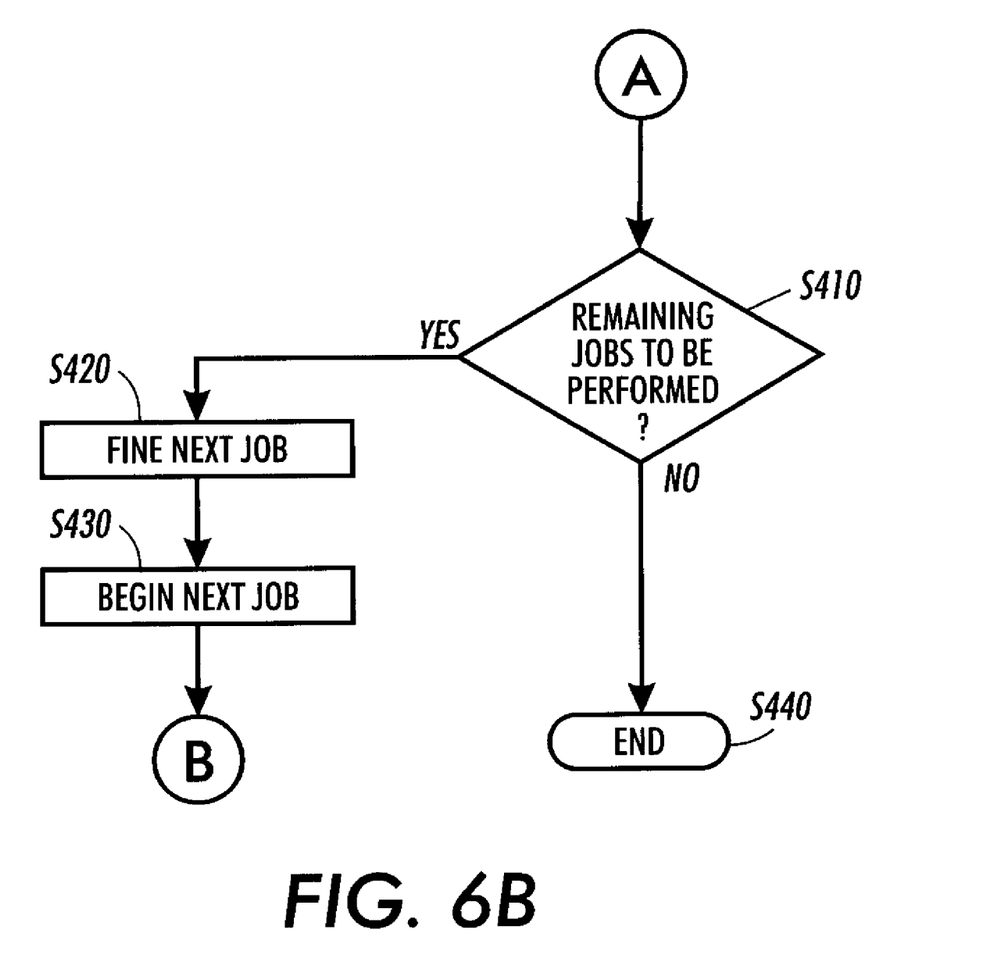

FIGS. 6A and 6B are a flowchart outlining a second exemplary embodiment of a job management method according to this invention. Beginning in step S300, control continues to step S310, where a determination is made whether a new set of data is input. If so, control continues to step S320. Otherwise, control jumps to step S330. In step S320, the sets of data to be input are input. Control then jumps back to step S310. In contrast, in step S330, a determination is made whether a new job is input. If so, control continues to step S340. Otherwise, control jumps to step S370.

In step S340, the new job is input and identified. Next, in step S350, a determination is made whether the new job depends on another job. If so, control continues to step S360. Otherwise, control jumps back to step S310. In step S360, the primary job is identified on which the secondary job depends and the queue entry for the primary job is updated to indicate that the new job depends on this primary job. Control then jumps back to step S310.

In step S370, a determination is made whether a deletion request is input. If so, control continues to step S380. Otherwise, control jumps to step S400. In step S380, the identifier of the job corresponding to the deletion request is read and any secondary job that depends on the job corresponding to the deletion request is identified, based on the identifier of the job corresponding to the deletion request. Next, in step S390, all of the secondary jobs that depend from the job corresponding to the deletion request and that job are deleted. Control then jumps back to step S310.

In step S400, a determination is made whether a current job is being performed. If so, control continues to step S410. Otherwise, control jumps back to step S310. In step S410, a determination is made whether there are any other jobs to be performed. If so, control continues to step S420. Otherwise, control jumps to step S440, where the process ends. In step S420, a next job to be performed is selected among the jobs still to be performed. Next, in step S430, the selected job is begun. Control then jumps back to step S310.

Each of the data processing systems 100 and 200 can be implemented on a programmed general purpose computer. However, each of the data processing systems 100 or 200 can also be implemented on a special purpose computer, a programmed microprocessor or microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device capable of implementing a finite state machine that is in turn capable of implementing the flowchart shown in FIGS. 4A and 4B and/or the flowchart shown in FIGS. 6A and 6B, can be used to implement the data processing systems 100 or 200, respectively.

In the exemplary embodiment shown in FIG. 2, the memory 240 can be a hard disk. However, in other exemplary embodiments of the data processing systems according to this invention, the memory 240 can be any known or later developed storage device, such as a floppy disk and drive, a hard disk and drive, a writeable CD-ROM or DVD disk and drive, flash memory, or the like.

Each of the links connecting the data processing systems 100 and 200 to the various peripheral devices or systems can be any known or later developed device or system for connecting a data processing system to a peripheral device or a network, including a direct cable connection, a connection over a wide area network or a local area network, a connection over an intranet or an extranet, a connection over the Internet, or a connection over any other distributed processing network or system.

Further, it should be appreciated that any of these links can be a wired or wireless link. The network 255 can be a wide area network or a local area network, an intranet or an extranet, the Internet or any other distributed processing network or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for processing a set of data, comprising:

defining at least one data processing sequence that is to be applied to at least a portion of the set of data;

assigning a relationship between first data processing sequence and each of at least one second data processing sequence;

receiving instructions for deleting the first data processing sequence;

determining which of the at least one second data processing sequence have a predetermined relationship with the first data processing sequence to be deleted; and deleting the first data processing sequence and each at least one second processing sequence having the predetermined relationship with the first data processing sequence to be deleted.

2. The data processing method of claim 1, wherein the predetermined relationship indicates that a second processing sequence depends on the first processing sequence.

3. The data processing method of claim 1, wherein the predetermined relationship is a proof relationship.

4. The data processing method of claim 1, wherein the predetermined relationship is a sample relationship.

5. The data processing method of claim 1, wherein data processing sequences comprise using the data to form an image.

6. The data processing method of claim 1, wherein assigning a relationship between each of the at least one second data processing sequence and the first data processing sequence comprises assigning an identifier to each second data processing sequence, the identifier indicating whether that second data processing sequence depends on the first data processing sequence.

7. The data processing method of claim 6, wherein determining which of the second data processing sequence have the predetermined relationship with the first data processing sequence comprises determining, for each second data processing sequence, if the identifier indicates that that second data processing sequence depends on the first data processing sequence.

8. The data processing method of claim 1, wherein assigning a relationship between each of the at least one second data processing sequence and the first data processing sequence comprises assigning an identifier to the first data processing sequence, the identifier indicating which second data processing sequence depends on the first data processing sequence.

9. The data processing method of claim 8, wherein determining which of the second data processing sequence have the predetermined relationship with the first data processing sequence comprises determining, for the first data processing sequence, if the identifier indicates that at least one second data processing sequence depends on the first data processing sequence.

10. A data processing device, comprising:

a data processing system that processes a set of data according to at least one data processing sequence associated with that set of data, and an interface that inputs at least one data processing sequence to be applied to a set of data a job manager that assigns a relationship between a first one of the data processing sequences and each of at least one second one of the data processing sequences and inputs at least one deletion request;

wherein, if a deletion request to delete the first data processing sequence is input through the interface, the data processing system determines if the assigned relationship between the first and second data processing sequences is a predetermined relationship, the second processing sequence along with the first data processing sequence if the assigned relationship is the predetermined relationship.

11. The data processing device of claim 10, wherein the data processing system causes an image to be formed based on the set of data.

* * * * *